(12) United States Patent  
Schmidt et al.

(10) Patent No.: US 7,687,047 B2  
(45) Date of Patent: Mar. 30, 2010

(54) SULFUR RECOVERY PROCESS

(75) Inventors: Roland Schmidt, Bartlesville, OK (US); Robert W. Morton, Bartlesville, OK (US); Edward L. Sughrue, II, Bartlesville, OK (US); Joseph B. Cross, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/054,068

(22) Filed: Mar. 24, 2008

(65) Prior Publication Data

US 2009/0196809 A1 Aug. 6, 2009

Related U.S. Application Data

(63) Continuation-in-part of application No. 12/023,193, filed on Jan. 31, 2008.

(51) Int. Cl.
*B01D 53/46* (2006.01)
*B01J 8/02* (2006.01)
*B01D 53/14* (2006.01)

(52) U.S. Cl. .............. 423/213.2; 423/210; 423/230

(58) Field of Classification Search .............. 423/210, 423/230
See application file for complete search history.

(56) References Cited

U.S. PATENT DOCUMENTS

| 4,233,276 A | | 11/1980 | D'Souza et al. |
| 4,338,288 A | * | 7/1982 | Rollmann ................. 423/210 |
| 5,219,542 A | | 6/1993 | Lowery et al. |
| 5,780,001 A | | 7/1998 | Khare et al. |
| 5,866,503 A | * | 2/1999 | Siriwardane ............. 502/439 |
| 6,214,311 B1 | | 4/2001 | Kwong |
| 6,656,877 B2 | | 12/2003 | Sughrue et al. |
| 6,683,024 B1 | | 1/2004 | Khare et al. |
| 6,951,635 B2 | * | 10/2005 | Gangwal et al. ....... 423/244.06 |
| 7,138,101 B2 | | 11/2006 | Keller et al. |
| 2003/0203815 A1 | * | 10/2003 | Khare et al. ............. 502/400 |
| 2003/0232723 A1 | * | 12/2003 | Dodwell et al. ......... 502/414 |

* cited by examiner

*Primary Examiner*—Jerry Lorengo
*Assistant Examiner*—Joseph V Micali

(57) ABSTRACT

A process for the simultaneous removal of $H_2S$ and $SO_2$ from tail gases is disclosed. A tail gas stream is contacted with a sorbent in a sorption zone to produce a product gas stream and a sulfur laden sorbent, wherein the sorbent comprises Zn and a promoter metal. A process for the recovery of sulfur is also disclosed. A tail gas stream is contacted with a sorbent in a sorption zone to produce solid sulfur, wherein the sorbent comprises Zn and a promoter metal, wherein the promoter metal is manganese.

24 Claims, 6 Drawing Sheets

SULFUR RECOVERY PROCESS

This application is a Continuation-in-Part of pending application Ser. No. 12/023,193, filed Jan. 31, 2008.

FIELD OF THE INVENTION

The present invention relates generally to contaminant removal from tail gas streams. In another aspect, the present invention relates to a process for removing one or more contaminants from a tail gas stream via contact with a regenerable sorbent. In another aspect, the present invention relates to a process for the recovery of sulfur.

BACKGROUND OF THE INVENTION

Tail gas streams originate from various sources. They are found in refinery off-gases as well as Claus units that are unable to convert all gaseous sulfur species to elemental sulfur. These tail gases contain $SO_2$ and $H_2S$ at levels exceeding permissible emission limits which are currently set at 10 ppm $H_2S$ and 250 ppm $SO_2$ in the United States. Tail gas compositions vary widely depending on the application. Often steam, syngas, and/or $CO_2$ are found in tail gases. Tail gases are mostly free of $O_2$ but often contain low levels of $H_2$.

One way to treat tail gases is by hydrotreating and amine scrubbing. Hydrotreating requires the whole gas stream to be heated to reaction temperature following a gas cool-down from 400° C. to near ambient temperatures prior to use. Inherent in this process is a significant energy penalty due to the heating and cooling steps required. The amine regeneration produces concentrated $H_2S$ which is returned to a Claus unit where it is converted to elemental sulfur.

Alternatively, the gas can be oxidized in a burner to form $SO_2$ as the only sulfur species. This option also requires a cool-down phase and additional equipment to scrub the $SO_2$ and to regenerate the scrubbing material. This is known as the CANSOLV® process (CANSOLV is a registered trademark of Cansolv Technologies, Inc.) and the regeneration produces concentrated $SO_2$ which is recycled to a Claus unit.

Claus units are useful for sulfur removal. However, Claus units typically operate at low temperatures (around 280° C.) requiring large waste heat boilers to cool feed gases and achieve high conversions only through multiple reactor beds thereby requiring a larger energy footprint. Further, their maximum sulfur conversion is 92% when current environmental regulations require greater than 98.5% sulfur recovery.

Accordingly, a need exists for a process to remove contaminants from a tail gas stream that eliminates the heating-up and cooling-down steps from the alternative processes. Additionally, a need exists for a sulfur recovery process which is economical and would require a smaller energy footprint.

SUMMARY OF THE INVENTION

In one embodiment of the present invention, there is provided a process for the simultaneous removal of $SO_2$ and $H_2S$, the process comprising, consisting of or consisting essentially of: a) contacting a tail gas stream comprising, consisting of, or consisting essentially of $SO_2$ and $H_2S$ with a sorbent in a sorption zone to produce a product gas stream and a sulfur laden sorbent, wherein the sorbent comprises Zn and a promoter metal; and b) contacting at least a portion of the sulfur laden sorbent with a regeneration gas stream in a regeneration zone to produce a regenerated sorbent and an off-gas stream.

In another embodiment of the present invention there is provided a process for the simultaneous removal of $SO_2$ and $H_2S$, the process comprising, consisting of, or consisting essentially of: a) reducing a sorbent with a reducing agent in a reduction zone to form a reduced sorbent, wherein the reduced sorbent comprises Zn, expanded perlite, and a promoter metal, wherein at least a portion of the reduced sorbent comprises a substitutional solid solution characterized by the formula $M_Z Zn_{(1-Z)} Al_2 O_4$ and a substitutional solid metal solution characterized by the formula $M_A Zn_B$, wherein M is a promoter metal component and A, B, and Z are in the range of from about 0.01 to about 0.99; b) contacting the reduced sorbent with a tail gas stream comprising $SO_2$ and $H_2S$ in a sorption zone to produce a product gas stream and a sulfur laden sorbent; c) regenerating the sulfur laden sorbent in a regeneration zone to produce a regenerated sorbent and an off gas comprising $SO_2$; d) returning at least a portion of the regenerated sorbent to said sorption zone; and e) recycling the $SO_2$ containing off gas to a $SO_2$ treatment zone.

In another embodiment of the present invention, there is provided a sulfur recovery process, comprising, consisting of, or consisting essentially of; a) contacting a tail gas stream comprising of $SO_2$ and $H_2S$ with a sorbent in a sorption zone to produce a product gas stream, solid sulfur, and a sulfur laden sorbent, wherein the sorbent comprises zinc and a promoter metal, wherein the promoter metal is manganese; and b) contacting at least a portion of the sulfur laden sorbent with a regeneration gas stream in a regeneration zone to produce a regenerated sorbent and an off-gas stream.

DETAILED DESCRIPTION OF THE INVENTION

Figure 1:
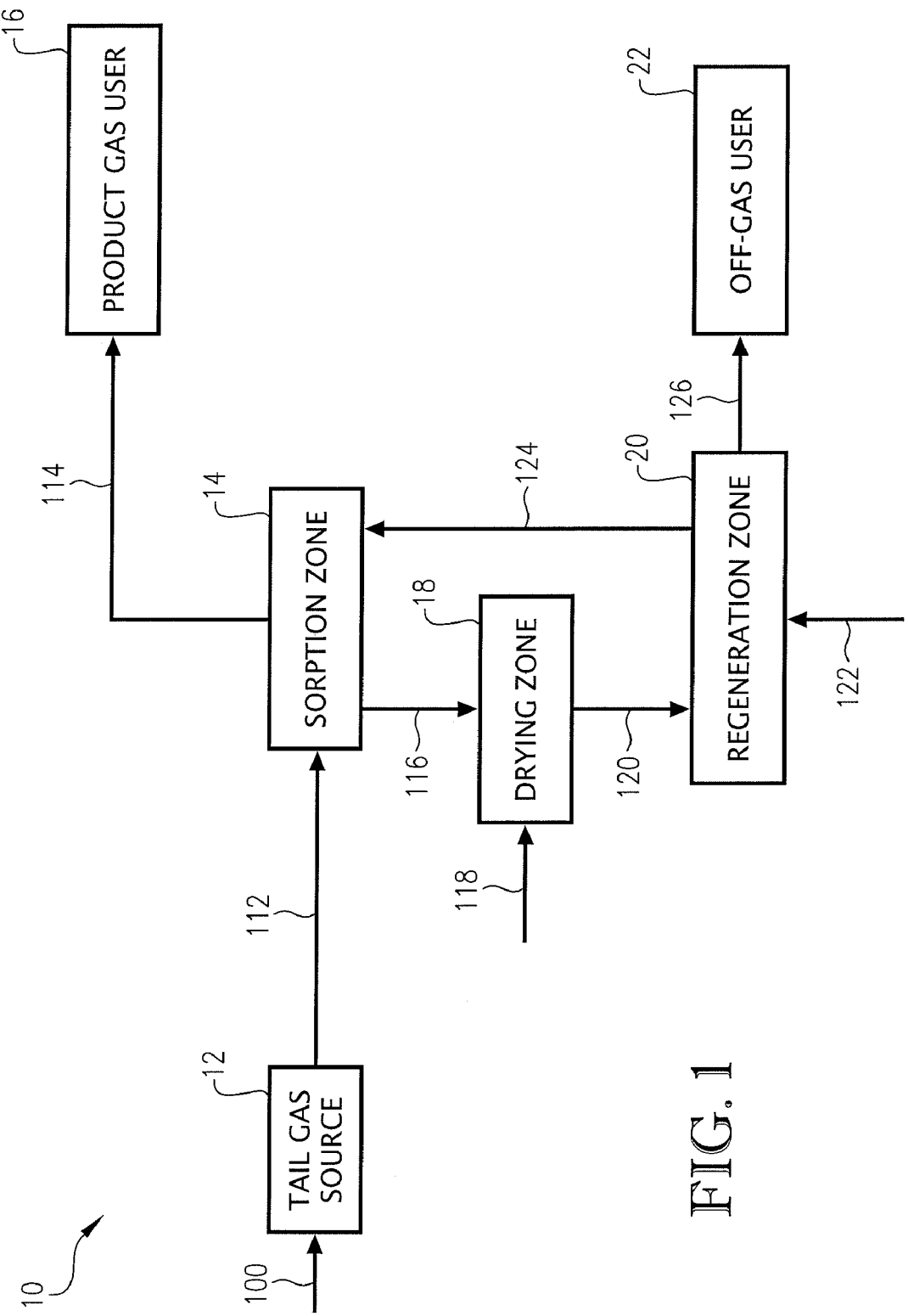
FIG. 1 is a schematic diagram of a contaminant removal system in accordance with one embodiment of the present invention.

Referring to FIG. 1, a contaminant removal system 10 is illustrated as generally comprising a tail gas source 12, a sorption zone 14, a product gas user 16, a drying zone 18, a regeneration zone 20, and an off-gas user 22. In general, a tail gas stream exiting tail gas source 12 can be contacted with a sorbent in sorption zone 14 to thereby remove one or more contaminants from the gas stream. The resulting, contaminant-depleted product gas stream exiting sorption zone 14 can be routed to product gas stream 16, while at least a portion of the contaminant-laden sorbent can be dried in drying zone 18 prior to being regenerated via contact with a regeneration gas in regeneration zone 20. The resulting off-gas stream exiting regeneration zone 20 can be routed to off-gas conduit 22, while at least a portion of the regenerated sorbent can then be returned to sorption zone 14 via conduit 124 for subsequent reuse. In one embodiment, at least one of the sorption, drying, and regeneration zones 14, 18, 20 can be contained within the same process vessel. In another embodiment, at least one of the sorption, drying, and regeneration zones 14, 18, 20 can be contained in two or more separate process vessels. Further, the contaminant removal system 10 depicted in FIG. 1 can be operated in continuous, semi-continuous, semi-batch, or batch mode. The operation of contaminant removal system 10 will now be described in more detail below.

Tail gas source 12 can comprise any source or system capable of producing a gas stream. In one embodiment, the tail gas stream from gas source 12 can comprise in the range of from about 1 ppmv to about 30 volume percent (1 vol. %=10,000 ppmv), from about 1 ppmv to about 10 volume percent, from about 1 ppmv to about 1 volume percent, or from 1 ppmv to 1000 ppmv of $SO_2$. In one embodiment, the tail gas stream from gas source 12 can comprise in the range of from about 1 ppmv to about 60 volume percent, from about 1 ppmv to about 20 volume percent, from about 1 ppmv to about 5 volume percent, or from 1 ppmv to 5000 ppmv of $H_2S$. For example, gas source 12 can comprise a Claus unit, a refinery or chemical plant process stream, or any other suitable source.

In one embodiment, the ratio of $H_2S$ to $SO_2$ in the tail gas stream exiting gas source 12 can be about 100:1, 10:1, 2:1, or 1:1. The tail gas stream can further comprise compounds selected from the group consisting of steam, syngas, $CO_2$, and combinations of any two or more thereof.

As depicted in FIG. 1, at least a portion of the tail gas stream exiting gas source 12 in conduit 112 can be routed into sorption zone 14, wherein the stream can be contacted with a sorbent to remove at least a portion of at least one contaminant from the incoming gas stream. In one embodiment, the tail gas stream is not cooled prior to entering sorption zone 14 and can have a temperature that is within about 200° C., about 100° C., or 50° C. of the temperature of the tail gas stream exiting gas source 12. Generally, the tail gas stream entering sorption zone 14 can have a temperature in the range of from about 150° C. to about 700° C., about 250° C. to about 600° C., or 350° C. to 450° C. and in the range of from about atmospheric to about 750 psig, about 250 psig to about 600 psig, or 350 psig to 450 psig.

In general, the sorbent employed in sorption zone 14 can be any sufficiently regenerable zinc-oxide-based sorbent composition having sufficient contaminant removal ability. While described below in terms of its ability to remove sulfur contaminants from an incoming tail gas stream, it should be understood that the sorbent of the present invention can also have significant capacity to remove one or more other contaminants.

In one embodiment of the present invention, the sorbent employed in sorption zone 14 can comprise zinc and a promoter metal component. The promoter metal component can comprise one or more promoter metals selected from the group consisting of nickel, cobalt, iron, manganese, tungsten, silver, gold, copper, platinum, zinc, tine, ruthenium, molybdenum, antimony, vanadium, iridium, chromium, palladium, and mixtures thereof. In one embodiment, at least a portion of the promoter metal component is present in a reduced-valence state. The valence reduction of the promoter metal component can be achieved by contacting the sorbent with a reducing agent within sorption zone 14 and/or prior to introduction into sorption zone 14. Any suitable reducing agent can be used, including, but not limited to hydrogen and carbon monoxide.

While not wishing to be bound by theory, when using a sorbent with nickel as the promoter metal, it is believed that nickel subsulfide ($NiS_2$) is formed by the reaction of nickel sulfide (NiS) and $SO_2$ in the presence of hydrogen. Nickel sulfide can originate from the reaction of nickel oxide and $H_2S$.

The suspected reaction mechanism is as follows:

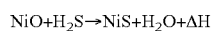

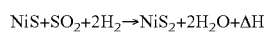

While not wishing to be bound by theory, when using a sorbent with manganese as the promoter metal, it is believed that solid elemental sulfur is formed by the reaction of manganese with $H_2S$ and $SO_2$.

The suspected reaction mechanism is as follows:

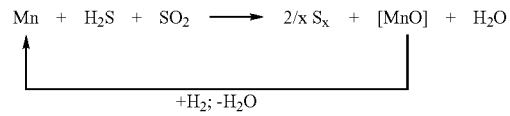

In one embodiment of the present invention, the reduced-valence promoter metal component can comprise, consist of, or consist essentially of, a substitutional solid metal solution characterized by the formula: $M_A Zn_B$, wherein M is the promoter metal and A and B are each numerical values in the range of from about 0.01 to about 0.99. In the above formula for the substitutional solid metal solution, A can be in the range of from about 0.70 to about 0.98 or 0.85 to 0.95 and B can be in the range of from about 0.03 to about 0.30 or 0.05 to 0.15. In one embodiment, A+B=1.

Substitutional solid solutions are a subset of alloys that are formed by the direct substitution of the solute metal for the solvent metal atoms in the crystal structure. For example, it is believed that the substitutional solid metal solution $M_A Zn_B$ is formed by the solute zinc metal atoms substituting for the solvent promoter metal atoms. Three basic criteria exist that favor the formation of substitutional solid metal solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc (as the elemental metal or metal oxide) employed in the sorbent described herein typically meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in an approximate 92:8 nickel zinc solid solution $Ni_{0.92}Zn_{0.08}$) that is formed during reduction and microscopically in the repeated regenerability of sorbent.

In addition to zinc and the promoter metal, the sorbent employed in sorption zone 14 can further comprise a porosity enhancer (PE) and an aluminate. The aluminate can comprise a promoter metal-zinc aluminate substitutional solid solution characterized by the formula: $M_Z Zn_{(1-Z)}Al_2O_4$, wherein M is the promoter metal and Z is in the range of from 0.01 to 0.99. The porosity enhancer, when employed, can be any compound which ultimately increases the macroporosity of the sorbent. In one embodiment, the porosity enhancer can comprise perlite. Examples of sorbents suitable for use in sorption zone 14 and methods of making these sorbents are described in detail in U.S. Pat. Nos. 6,429,170 and 7,241,929, the entire disclosures of which are incorporated herein by reference.

Table 1, below, provides the composition of a sorbent employed in sorption zone 14 according to an embodiment of the present invention where reduction of the sorbent is carried out prior to introduction of the sorbent into sorption zone 14.

TABLE 1

| Range | Reduced Sorbent Composition (wt %) | | | |
|---|---|---|---|---|
| | ZnO | $M_AZn_B$ | PE | $M_ZZn_{(1-Z)}Al_2O_4$ |
| Broad | 0-90 | 5-80 | 2-50 | 2-50 |
| Intermediate | 10-60 | 10-60 | 5-30 | 5-30 |
| Narrow | 30-40 | 30-40 | 10-20 | 10-20 |

In an alternative embodiment where the sorbent is not reduced prior to introduction into sorption zone 14, the promoter metal component can comprise a substitutional solid metal oxide solution characterized by the formula $M_XZn_YO$, wherein M is the promoter metal and X and Y are in the range of from about 0.01 to about 0.99. In one embodiment, X can be in the range of from about 0.5 to about 0.9, about 0.6 to about 0.8, or 0.65 to 0.75 and Y can be in the range of from about 0.10 to about 0.5, about 0.2 to about 0.4, or 0.25 to 0.35. In general, X+Y=1.

Table 2, below, provides the composition of an unreduced sorbent employed in sorption zone 14 according to an embodiment where the sorbent is not reduced prior to introduction into sorption zone 14.

TABLE 2

| Range | Unreduced Sorbent Composition (wt %) | | | |
|---|---|---|---|---|
| | ZnO | $M_XZn_YO$ | PE | $M_ZZn_{(1-Z)}Al_2O_4$ |
| Broad | 0-90 | 5-70 | 2-50 | 2-50 |
| Intermediate | 10-70 | 10-60 | 5-30 | 5-30 |
| Narrow | 35-45 | 25-35 | 10-20 | 10-20 |

As mentioned above, when an unreduced sorbent composition is contacted with a hydrogen containing compound in sorption zone 14, reduction of the sorbent can take place in sorption zone 14. Therefore, when sorbent reduction takes place in sorption zone 14, the initial sorbent contacted with the raw gas stream in sorption zone 14 can be a mixture of reduced sorbent (Table 1) and unreduced sorbent (Table 2).

In general, the incoming tail gas stream can contact the initial sorbent in sorption zone 14 at a temperature in the range of from about 150° C. to about 1000° C., about 250° C. to about 700° C., or 350° C. to 550° C. and a pressure in the range of from about atmospheric pressure to about 5000 psig, about atmospheric pressure to about 1000 psig, or atmospheric pressure to 500 psig. At least a portion of sulfur-containing compounds (and/or other contaminants) in the tail gas stream can be sorbed by the sorbent, thereby creating a sulfur-depleted product gas stream and a sulfur-laden sorbent. In one embodiment, where a manganese-promoted sorbent is used, solid sulfur can form in sorption zone 14. The solid sulfur can then be discharged from sorption zone through a conduit (not shown). In one embodiment, sulfur-removal efficiency of sorption zone 14 can be greater than about 85 percent, greater than about 90 percent, greater than about 95 percent, greater than about 98 percent, or greater than 99 percent.

As depicted in FIG. 1, at least a portion of the contaminant-depleted product gas stream can exit sorption zone 14 via conduit 16. In one embodiment, the product gas stream can comprise less than about 1 volume percent, less than about 1000 ppmv, less than about 10 ppmv, or less than 1 ppmv of sulfur-containing components. As shown in FIG. 1, the contaminant-depleted product gas stream can then be routed to a product gas user 16. Product gas user 16 can comprise a vent.

As depicted in FIG. 1, at least a portion of the sulfur-laden sorbent discharged from sorption zone 14 can be routed to drying zone 18 via conduit 116. In one embodiment, the sulfur-laden sorbent can have a sulfur loading in the range of from about 0.1 to about 27, about 3 to about 26, about 5 to about 25, or 10 to 20 weight percent. In drying zone 18, at least a portion of the sulfur-laden sorbent can be dried by flowing an inert gas purge stream in conduit 118 having a temperature in the range of from about 100 to about 550° C., about 150 to about 500° C., or 200 to 475° C. through the sorbent for a time period of at least about 15 minutes, or a time period in the range of from about 30 minutes to about 100 hours, about 45 minutes to about 36 hours, or 1 hour to 12 hours. The resulting dried, sulfur-laden sorbent can then be routed to regeneration zone 20 via conduit 120, as illustrated in FIG. 1.

Regeneration zone 20 can employ a regeneration process capable of removing least a portion of the sulfur (or other sorbed contaminants) from the sulfur-laden sorbent via contact with a regeneration gas stream under sorbent regeneration conditions. In one embodiment, the regeneration gas stream entering regeneration zone 20 via conduit 122 can comprise an oxygen-containing gas stream, such as, for example, air (e.g., about 21 volume percent oxygen). In another embodiment, the regeneration gas stream in conduit 120 can be an oxygen-enriched gas stream comprising at least about 50, at least about 75, at least about 85, or at least 90 volume percent oxygen. In yet another embodiment, the regeneration gas stream can comprise a substantially pure oxygen stream.

According to one embodiment of the present invention, the regeneration process employed in regeneration zone 20 can be a step-wise regeneration process. In general, a step-wise regeneration process includes adjusting at least one regeneration variable from an initial value to a final value in two or more incremental adjustments (i.e., steps). Examples of adjustable regeneration variables can include, but are not limited to, temperature, pressure, and regeneration gas flow rate. In one embodiment, the temperature in regeneration zone 20 can be increased by a total amount that is at least about 75° C., at least about 100° C., or at least 150° C. above an initial temperature, which can be in the range of from about 250 to about 650° C., about 300 to about 600° C., or 350 to 550° C. In another embodiment, the regeneration gas flow rate can be adjusted so that the standard gas hourly space velocity (SGHSV) of the regeneration gas in contact with the sorbent can increase by a total amount that is at least about 1,000, at least about 2,500, at least about 5,000, or at least 10,000 volumes of gas per volume of sorbent per hour (v/v/h or $h^{-1}$) above an initial SGHSV value, which can be in the range of from about 100 to about 100,000 $h^{-1}$, about 1,000 to about 80,000 $h^{-1}$, or 10,000 to 50,000 $h^{-1}$.

In one embodiment, the size of the incremental adjustments (i.e., the incremental step size) can be in the range of from about 2 to about 50, about 5 to about 40, or 10 to 30 percent of magnitude of the desired overall change (i.e., the difference between the final and initial values). For example, if an overall temperature change of about 150° C. is desired, the incremental step size can be in the range of from about 3 to about 75° C., about 7.5 to about 60° C., or 15 to 45° C. In another embodiment, the magnitude of the incremental step size can be in the range of from about 2 to about 50, about 5 to about 40, or 10 to 30 percent of magnitude of the initial variable value. For example, if the initial regeneration temperature is 250° C., the incremental step size can be in the range of from about 5 to about 125° C., about 12.5 to about 100° C., or 25 to 75° C. In general, successive incremental steps can have the same incremental step sizes, or, alternatively, one or more incremental step sizes can be greater than or less than the incremental step size of the preceding or subsequent steps.

In one embodiment, subsequent adjustments to the regeneration variable(s) can be carried out at predetermined time intervals. For example, adjustments can be made after time intervals in the range of from about 1 minute to about 45 minutes, about 2 minutes to about 30 minutes, or 5 to 20 minutes. In another embodiment, the adjustments can be made based on the value(s) of one or more "indicator" variable(s). An indicator variable is a variable in the system monitored to determine the progress of the sorbent regeneration. Examples of indicator variables can include, but are not limited to, sorbent sulfur loading, regeneration sorbent bed temperature, regeneration zone temperature profile (i.e., exotherm), and off-gas stream composition. In one embodiment, the sulfur dioxide ($SO_2$) concentration in the off-gas stream is monitored to determine when the flow rate of the regeneration gas and/or the regeneration temperature should be incrementally adjusted.

The regeneration process can be carried out in regeneration zone 20 until at least one regeneration end point is achieved. In one embodiment, the regeneration end point can be the achievement of a desired value for one or more of the adjusted regeneration variables. For example, the regeneration process can be carried out until the temperature achieves a final value in the range of from about 300 to about 800° C., about 350 to about 750° C., or 400 to 700° C. or the SGHSV reaches a final value in the range of from about 1,100 to about 110,000 $h^{-1}$, about 5,000 to about 85,000 $h^{-1}$, or 25,000 to 60,000 $h^{-1}$. In another embodiment, the regeneration process can be finished after a predetermined number of variable adjustments. For example, the regeneration process can be carried out long enough for at least 1 or in the range of from about 2 to about 8 or 3 to 5 incremental adjustments to be made. In yet another embodiment, the regeneration process can be carried out until a final value of the selected indicator variable is achieved. For example, the regeneration process can be carried out until the concentration of $SO_2$ in the off-gas exiting regeneration zone 20 declines to a value less than about 1 volume percent, less than about 0.5 volume percent, less than about 0.1 volume percent, or less than 500 ppmv. Regardless of the specific endpoint selected, the entire length of the regeneration process can be less than about 100 hours, or in the range of from about 30 minutes to about 48 hours, about 45 minutes to about 24 hours, or 1.5 to 12.5 hours.

In one embodiment, the above-described regeneration process can have a regeneration efficiency of at least about 75 percent, at least about 85 percent, at least about 90 percent, at least about 95 percent, at least about 98 percent, or at least 99 percent. The regenerated sorbent can have a sulfur loading that is less than about 10 weight percent, or in the range of from about 0.05 to about 6 weight percent, or 0.1 to 4 weight percent.

As illustrated in FIG. 1, at least a portion of the regenerated sorbent in conduit 124 can then be returned to sorption zone 14. As discussed above, in one embodiment, at least a portion of the regenerated sorbent does not undergo a reduction step prior to introduction into sorption zone. In such an embodiment, the regenerated but unreduced sorbent introduced into sorption zone 14 can comprise an unreduced promoter metal component that includes a substitutional solid metal oxide solution characterized by the formula $M_XZn_YO$ (See e.g., Table 3, above).

Referring back to FIG. 1, the off-gas stream exiting regeneration zone 20 via conduit 126 can subsequently be routed to off-gas user 22. Off-gas user 22 can comprise any unit capable of processing the off-gas stream, such as, for example, a Claus sulfur processing unit. In one embodiment, the off-gas stream exiting regeneration zone 20 via conduit 126 can comprise at least about 5, at least about 10, at least about 20, or at least 25 volume percent $SO_2$. In one embodiment, the off-gas stream comprises less $H_2S$ than in the tail gas stream entering sorption zone 14 via conduit 112. In another embodiment, off-gas stream can comprise substantially no $H_2S$.

EXAMPLES

The following examples are intended to be illustrative of the present invention and to teach one of ordinary skill in the art to make and use the invention. These examples are not intended to limit the invention in any way.

A sorbent was exposed to several simulated feeds representing various tail gas compositions. The feeds had a general $H_2S$ to $SO_2$ ratio of about 2:1.

Sorbents containing nickel, zinc, alumina, and expanded perlite were crushed and sieved to obtain 100+/200-mesh size particles. The sorbents were then contacted with the simulated tail gas streams. For Example 2, the sorbent was reduced with hydrogen before being contacted with the feeds, and for Examples 3-5, the sorbents were reduced in-situ during contact with the feeds.

A 1:1 mixture of sorbent and alundum was used to prevent the reactor bed from plugging. This mixture was placed in a downflow fixed bed reactor and heated to 400° C. and slightly elevated pressure to warrant feed flow through the system. To prevent steam from condensing in the reactor, all sample lines, valves, and other sample system components were heat-traced to maintain a temperature above 150° C. both up- and downstream of the reactor. Before analyzing the downstream off-gases, the steam was condensed to protect the on-line analyzers. For Examples 3-5, where a pre-reduction step was carried out, the sorbent was exposed to a 20 volume percent $H_2/N_2$ gas mixture until water levels in the off-gas were back to approximately their initial levels.

Example 1

Figure 2:
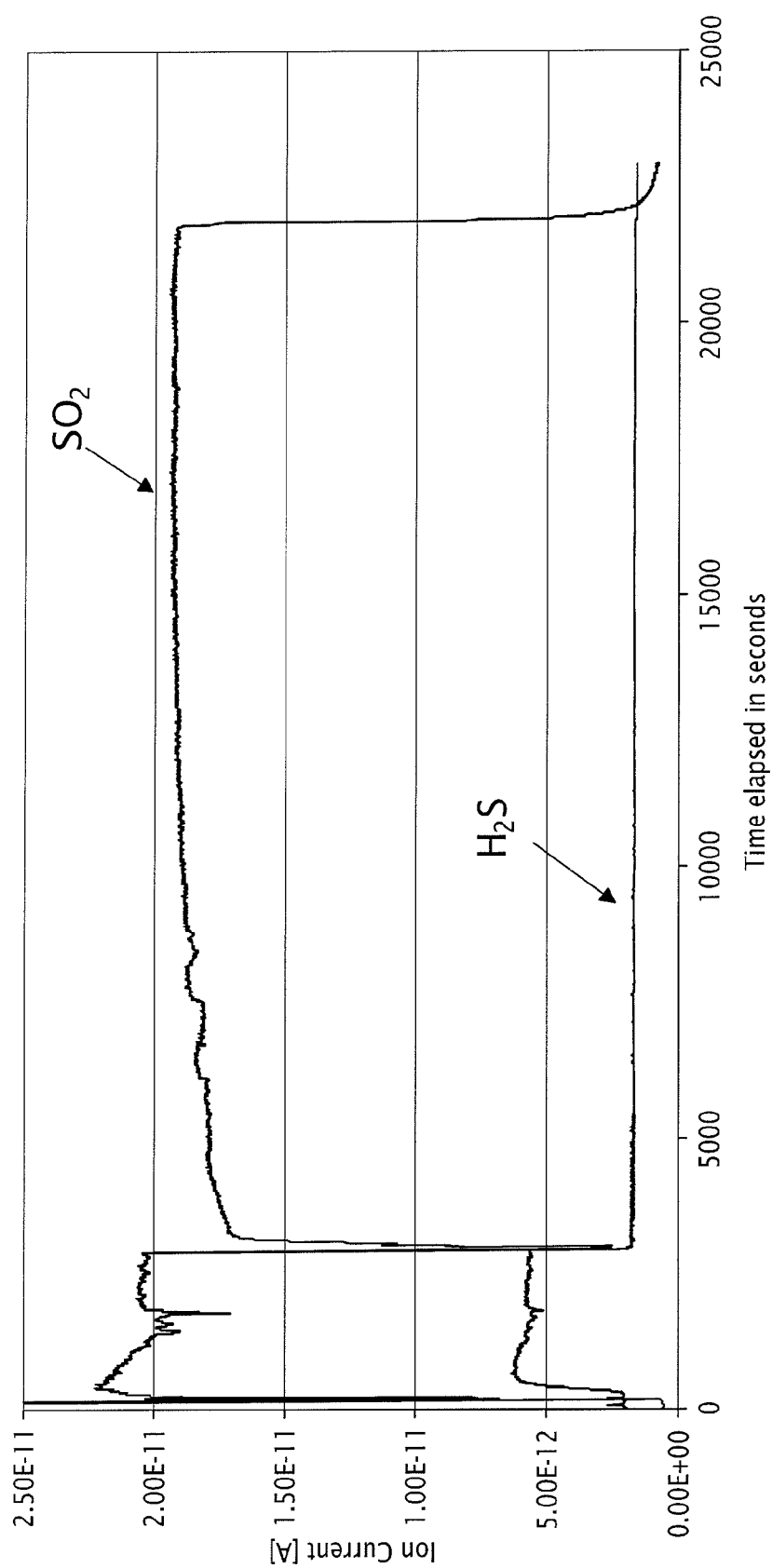
FIGS. 2, 3, 4, 5, and 6 are plots of the time elapsed vs. ion current from Mass Spectral Analysis of different components in tail gas during runs in which simulated tail gas feeds are contacted with sorbents.

This Example was conducted using an unreduced sorbent. The feed stream used contained $N_2$ with 243 ppmv $SO_2$ and 243 ppmv $H_2S$. FIG. 2 shows that $H_2S$ is sorbed, but $SO_2$ remains in the off-gases.

Example 2

Figure 3:
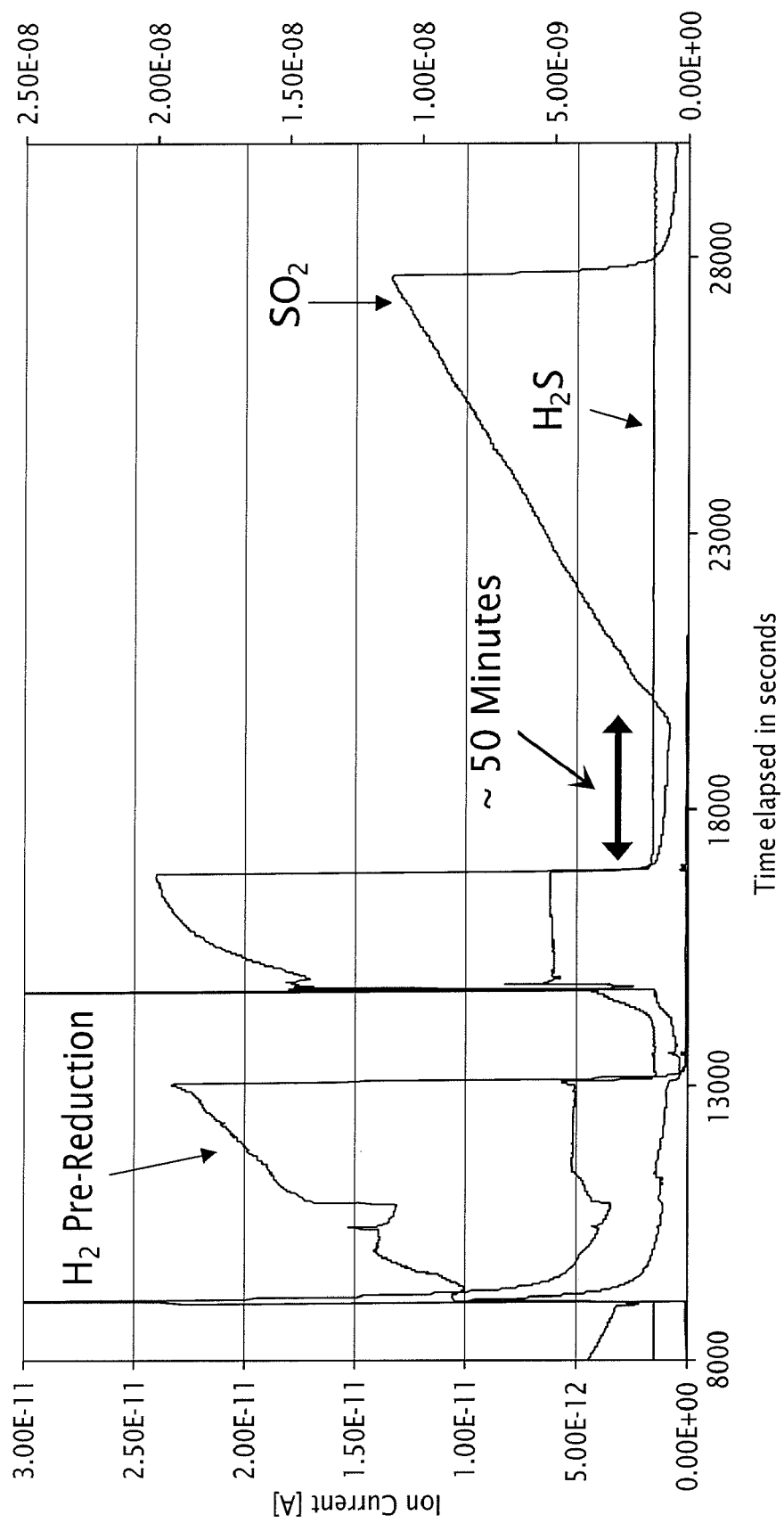

In this Example, the sorbent was pre-reduced with $H_2$. In this case, complete conversion and storage of both contaminants into the sorbent was achieved. This reaction continued as long as reduced active components were available. Even when these resources neared exhaustion (after 50+ minutes), $H_2S$ was still removed due to the excess availability of ZnO. This is shown in detail in FIG. 3.

Example 3

Figure 4:
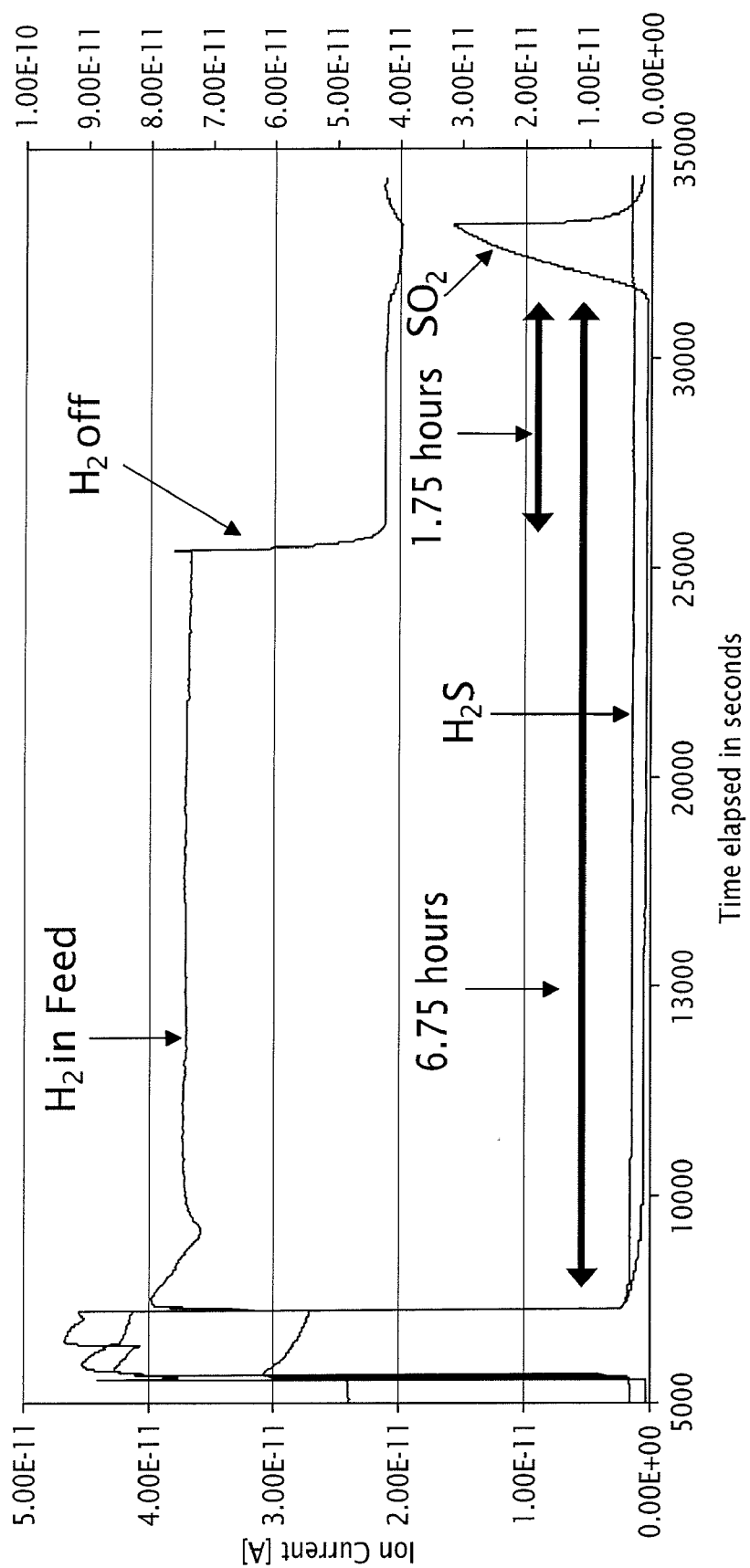

In this Example, a small amount of a reductant ($H_2$) was added to the feed. This in-situ reduction forms active species capable of reducing $SO_2$ and storing the resulting sulfur into the sorbent. This is shown in FIG. 4. When the source of $H_2$ was removed, simultaneous removal of $H_2S$ and $SO_2$ continued for approximately 8000 seconds, after which the amount of $SO_2$ in the feed or effluent increased.

Example 4

A gas composition resembling refinery off-gases was simulated to show that both $SO_2$ and $H_2S$ can be removed under these conditions. These gases tend to contain larger amounts of steam. The gas composition studied is shown in Table 3.

TABLE 3

Refinery Gas Simulation

| Component | Amount |
| --- | --- |
| $SO_2$ [ppm] | 2000 |
| $H_2S$ [ppm] | 10000 |
| $H_2$ [%] | 1 |
| CO [%] | — |
| $CO_2$ [%] | 4 |
| $H_2O$ [%] | 32 |
| Balance $N_2$ | |

Figure 5:
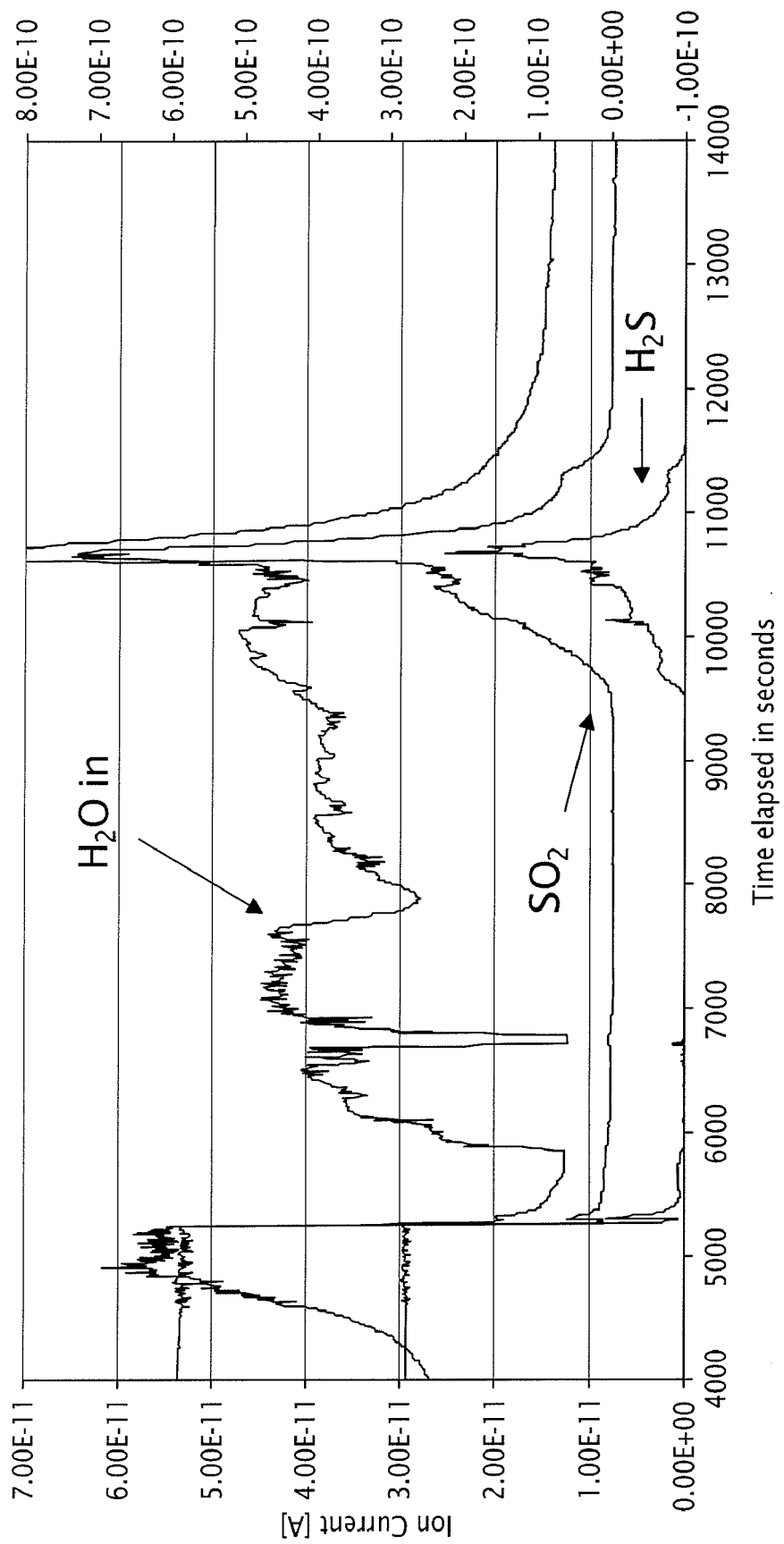

The results are shown in FIG. 5. The sorbent achieved comparable removal levels to detection limits for both contaminants as long as reduced active components (Ni and Zn) were available.

Example 5

A Claus unit tail gas simulation was also tested. This tail gas contains syngas, $CO_2$, $H_2S$ and $SO_2$, but very low moisture levels. Table 4 below shows the composition of the Claus unit tail gas tested.

TABLE 4

Claus Simulation

| Component | Amount |
| --- | --- |
| $SO_2$ [ppm] | 330 |
| $H_2S$ [ppm] | 660 |
| $H_2$ [%] | 20 |
| CO [%] | 20 |
| $CO_2$ [%] | 8 |
| $H_2O$ [%] | — |
| Balance $N_2$ | |

Figure 6:
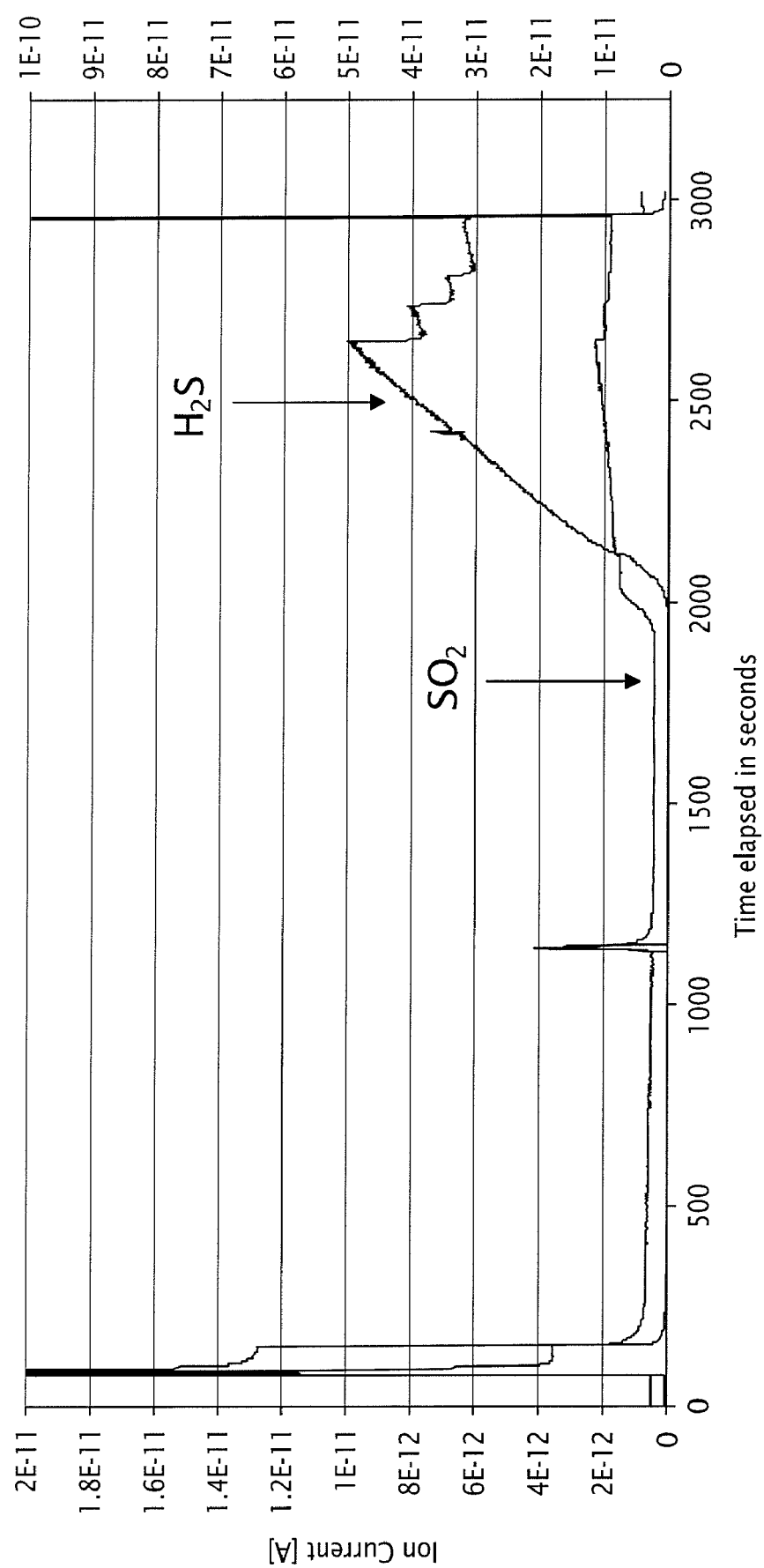

FIG. 6 shows that the sorbent achieved the same removal efficiency observed before for other feed compositions.

Example 6

Another 2.5-gram quantity of a manganese promoted zinc oxide sorbent (metal ratio Mn:Zn=4:1 on silica as support material) was mixed with 2.5 grams of alundum. This mixture was placed in a reactor tube and was purged with nitrogen at a temperature of 400° C. At a temperature of 392° C., the mixture was contacted with a feed containing 10 mL/min H2, 200 mL/min N2, 100 mL/min "H2S" (5 vol. % H2S balance N2 gas mixture), 200 ml/min "SO2" (5 vol. % SO2 balance N2 gas mixture). After 45 minutes on-stream, the reactor tube was clogged with a yellow solid. This solid was analyzed and was found to be elemental sulfur.

Example 7

Another 2.5-gram quantity of a manganese promoted zinc oxide sorbent on silica as a support material was mixed with 2.5 grams of alundum. This mixture was placed in a reactor tube and was purged with nitrogen at a temperature of 400° C. The mixture was then contacted with a feed identical in composition to the feed in Example 6. The temperature was 400° C. After about 15 minutes on-stream, the reactor tube was clogged with a yellow solid substance. The reactor was unclogged and the process was started once more. After about one hour and twenty minutes on-stream, the reactor began to clog again with a yellow solid substance. This substance was elemental sulfur.

Example 8

Another 2.5-gram quantity of a manganese promoted zinc oxide sorbent on silica as a support material was mixed with 2.5 grams of alundum. This mixture was placed in a reactor tube and was purged with nitrogen at a temperature of 400° C. The mixture was then contacted with a feed containing 10 mL/min H2, 600 mL/min N2, and 100 mL/min "H2S." This feed did not contain SO2. The temperature was 400° C. The sorbent mixture was contacted with the feed for about 3 hours. No elemental sulfur was formed.

Example 9

Another 2.5-gram quantity of a manganese-promoted zinc oxide sorbent on silica as a support material was mixed with 2.5 grams of alundum. This mixture was placed in a reactor tube and was purged with nitrogen at a temperature of 400° C. The mixture was then contacted with a feed containing 10 mL/min H2, 500 mL/min N2, and 200 mL/min "SO2." This feed did not contain H2S. The temperature was 400° C. The sorbent mixture was contacted with the feed for about one hour and twenty minutes. No elemental sulfur was formed.

Example 10

Another 2.5-gram quantity of a manganese promoted zinc oxide sorbent on silica as a support material was mixed with 2.5 grams of alundum. This mixture was placed in a reactor tube and was reduced with hydrogen gas at a temperature of about 450° C. The mixture was purged with nitrogen at 400° C., as in the previous examples, and was then contacted with a feed containing 10 mL/min H2, 600 mL/min N2, and 100 mL/min H2S. This feed did not contain SO2. The temperature was 400° C. The sorbent mixture was contacted with the feed for about 3 and a half hours. No elemental sulfur was formed.

Example 11

Another 2.5-gram quantity of a manganese promoted zinc oxide sorbent on silica as a support material was mixed with 2.5 grams of alundum. This mixture was placed in a reactor tube and was reduced with hydrogen gas at a temperature of about 450° C. as in Example 10, above. The mixture was purged with nitrogen at 400° C., as in the previous examples, and was then contacted with a feed containing 10 mL/min H2, 500 mL/min N2, and 200 mL/min SO2. This feed did not contain H2S. The temperature was 400° C. The sorbent mixture was contacted with the feed for about 2 hours and 10 minutes. No elemental sulfur was formed.

That which is claimed is:

1. A sulfur recovery process, comprising;
   a) providing a sorbent comprising a substitutional solid solution characterized by the formula $Mn_zZn_{(1-z)}Al_2O_4$
   b) contacting the sorbent with a reducing agent in a reduction zone,
       wherein as a result of said contacting, at least a portion of the promoter metal component of the sorbent is converted to a reduced-valence state,
   c) contacting a tail gas stream comprising $SO_2$ and $H_2S$ with the sorbent in a sorption zone
       wherein said contacting simultaneously reduces the quantity of $SO_2$ and $H_2S$ present in the tail gas, thereby producing a product gas stream, solid sulfur, and a sulfur laden sorbent, and,
       wherein as a result of said contacting, the Mn promoter metal of the sorbent reacts simultaneously with both $H_2S$ and $SO_2$ to produce solid elemental sulfur and water according to the reaction:

$$Mn+H_2S+SO_2 \rightarrow 2/xS_x+MnO+H_2O,$$

d) contacting at least a portion of said sulfur laden sorbent with a regeneration gas stream in a regeneration zone to produce a regenerated sorbent and an off-gas stream.

2. A process in accordance with claim 1, further comprising, prior to step (d), drying at least a portion of said sulfur-laden sorbent to thereby provide a dried sulfur-laden sorbent and subjecting at least a portion of said dried sulfur-laden sorbent to said contacting of step (d).

3. A process in accordance with claim 1, further comprising introducing at least a portion of said regenerated sorbent into said sorption zone, wherein said regenerated sorbent introduced into said sorption zone comprises a substitutional solid metal oxide solution characterized by the formula $Mn_xZn_yO$,
   wherein X and Y are in the range from about 0.01 to about 0.99.

4. A process in accordance with claim 1, wherein said tail gas stream comprises $SO_2$ in the range of up to about 5 volume percent, based on the total volume of said tail gas stream.

5. A process in accordance with claim 1, wherein said tail gas stream comprises $H_2S$ in the range of up to about 5 volume percent, based on the total volume of said tail gas stream.

6. A process in accordance with claim 1, wherein said tail gas stream has a ratio of $H_2S$ to $SO_2$ of about 100:1.

7. A process in accordance with claim 1, wherein said tail gas stream has a ratio of $H_2S$ to $SO_2$ of about 10:1.

8. A process in accordance with claim 1, wherein said tail gas stream has a ratio of $H_2S$ to $SO_2$ of about 2:1.

9. A process in accordance with claim 1 wherein said tail gas stream further comprises compounds selected from the group consisting of steam, syngas, $CO_2$, and combinations of any two or more thereof.

10. A process in accordance with claim 1 wherein said reducing agent comprises an agent selected from the group consisting of hydrogen and carbon monoxide.

11. A process in accordance with claim 1 wherein said tail gas further comprises a reducing agent.

12. A process in accordance with claim 11 wherein said reducing agent comprises an agent selected from the group consisting of hydrogen and carbon monoxide.

13. A process in accordance with claim 1 wherein conditions in said sorption zone include a temperature in the range of from about 150° C. to about 1000° C.

14. A process in accordance with claim 1 wherein conditions in said sorption zone include a temperature in the range of from about 250° C. to about 700° C.

15. A process in accordance with claim 1 wherein conditions in said sorption zone include a temperature in the range of from about 350° C. to about 550° C.

16. A process in accordance with claim 1 wherein conditions in said sorption zone include a pressure in the range of from about atmospheric pressure to about 5000 psig.

17. A process in accordance with claim 1 wherein conditions in said sorption zone include a pressure in the range of from about atmospheric pressure to about 1000 psig.

18. A process in accordance with claim 1 wherein conditions in said regeneration zone includes a regeneration gas stream.

19. A process in accordance with claim 18 wherein said regeneration gas stream comprises oxygen.

20. A process in accordance with claim 18 wherein said regeneration gas stream comprises air.

21. A process in accordance with claim 1 wherein said off-gas stream comprises $SO_2$.

22. A process in accordance with claim 21 wherein said off-gas stream is recycled to a $SO_2$ treatment zone.

23. A process in accordance with claim 22 wherein said $SO_2$ treatment zone comprises a Claus unit.

24. A process in accordance with claim 1 wherein at least a portion of said regenerated sorbent is returned to said sorption zone.

* * * * *